US010169778B1

(12) United States Patent
Collin et al.

(10) Patent No.: US 10,169,778 B1
(45) Date of Patent: Jan. 1, 2019

(54) CROSS-CHANNEL ONLINE ADVERTISING ATTRIBUTION

(71) Applicant: Amazon Technologies, Inc., Seattle, WA (US)

(72) Inventors: Guthrie Chipman Collin, New York, NY (US); Timothy John Craycroft, North Bend, WA (US); Paula Marie Despins, Seattle, WA (US); Richard Everett Edwards, III, Seattle, WA (US); Cyrus Khoshnevisan, Mercer Island, WA (US); John Michael Nilles, Poulsbo, WA (US); Evgeniy V. Perevodchikov, Seattle, WA (US); Jaikannan Ramamoorthy, Cupertino, CA (US); Shiven Ramji, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 14/669,945

(22) Filed: Mar. 26, 2015

(51) Int. Cl.
*G06Q 30/02* (2012.01)

(52) U.S. Cl.
CPC .............................. *G06Q 30/0246* (2013.01)

(58) Field of Classification Search
CPC ............... G06Q 30/02; G06Q 30/0243; G06Q 30/0247; G06Q 40/00
USPC ............................................. 705/14.1, 14.45
See application file for complete search history.

(56) References Cited

U.S. PATENT DOCUMENTS

| 6,484,182 | B1 | 11/2002 | Dunphy et al. | |
|---|---|---|---|---|
| 7,587,502 | B2 | 9/2009 | Crawford et al. | |
| 7,711,586 | B2 | 5/2010 | Aggarwal et al. | |
| 8,527,350 | B2 * | 9/2013 | Ma .......................... | G06Q 30/02 705/14.68 |
| 8,732,322 | B1 | 5/2014 | Agrawal et al. | |
| 9,515,984 | B1 | 12/2016 | Griggs et al. | |
| 2007/0073585 | A1 * | 3/2007 | Apple ..................... | G06Q 30/02 705/14.46 |
| 2007/0244746 | A1 | 10/2007 | Issen et al. | |
| 2010/0198680 | A1 * | 8/2010 | Ma .......................... | G06Q 30/02 705/14.45 |
| 2011/0191714 | A1 | 8/2011 | Ting et al. | |
| 2011/0238525 | A1 * | 9/2011 | Linden ................... | G06Q 30/02 705/26.7 |
| 2013/0124309 | A1 | 5/2013 | Traasdahl et al. | |
| 2013/0124315 | A1 | 5/2013 | Doughty | |
| 2013/0290711 | A1 | 10/2013 | Rajkumar et al. | |
| 2013/0332604 | A1 | 12/2013 | Seth et al. | |
| 2015/0341453 | A1 | 11/2015 | Miller et al. | |

(Continued)

*Primary Examiner* — John Van Bramer
(74) *Attorney, Agent, or Firm* — Eversheds Sutherland (US) LLP

(57) ABSTRACT

The systems and methods described herein enable measurement of the exposure of a user to advertising campaigns across different channels (e.g., websites accessed by web browsers of laptops, desktops, or mobile computers, electronic readers or tablets, applications on mobile devices, and the like) and credit the exposure of the user to the advertisement to a specific advertisement in the campaign along with subsequent shopping events generated by the user, such as visiting product detail pages, visiting the read all reviews page for a product, adding a product to a wish list, adding a product to a shopping cart, subscribing to a product through an online subscription service, and/or purchasing a product.

26 Claims, 6 Drawing Sheets

(56) References Cited

U.S. PATENT DOCUMENTS

2016/0027040 A1    1/2016  Clemente Filho et al.
2016/0071144 A1    3/2016  Abedi et al.
2017/0206552 A1*  7/2017  Rajkumar .............. G06Q 30/02

* cited by examiner

US 10,169,778 B1

CROSS-CHANNEL ONLINE ADVERTISING ATTRIBUTION

BACKGROUND

Online advertising is a rapidly growing segment of electronic commerce (e-commerce). Online advertising is the delivery of promotional marketing messages to consumers over the Internet. Examples of online advertising may include email marketing, search engine marketing, social media marketing, many types of display advertising, and mobile advertising. Advertisers may invest in an advertising campaign, which may include delivery of advertisements to users over different types of devices. For example, an advertising campaign may involve emailing advertisements, publishing advertisements on websites, publishing advertisements on social media, and the like. The different modes of delivery of the advertisements may be referred to as channels. Thus, if a user receives an email on their mobile device and also sees the advertisement on a webpage using a web browser on a laptop, then the user has been reached over different channels.

Accordingly, users may utilize multiple devices before executing a conversion event, such as a purchase of a product. However, the use of multiple devices may cause difficulties in crediting a specific advertisement exposed or delivered to a user with a conversion event, which may include, but is not limited to, visiting product detail pages, visiting the read all reviews page for a product, adding a product to a wish list, adding a product to a shopping cart, subscribing to a product, and/or purchasing a product. For example, a user may first be exposed to a particular ad through a promotional email received on a smartphone. The user may later use a web browser on their laptop to visit a webpage for the product of the ad and ultimately purchase the product. However, because the initial ad exposure was through the email, it may be difficult to credit the advertisement in the email with the conversion event of purchasing the product of the ad. The inability to credit advertisements across different devices may result in inaccurate accounting for an ad campaign and an incorrect estimate of the effectiveness of an advertisement. For example, some advertisements may not be credited with any conversion events, despite users purchasing the product as a result of viewing the advertisement on a different device. Similarly, some advertisements may receive duplicative credits even though the product purchase was a result of viewing a different advertisement.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
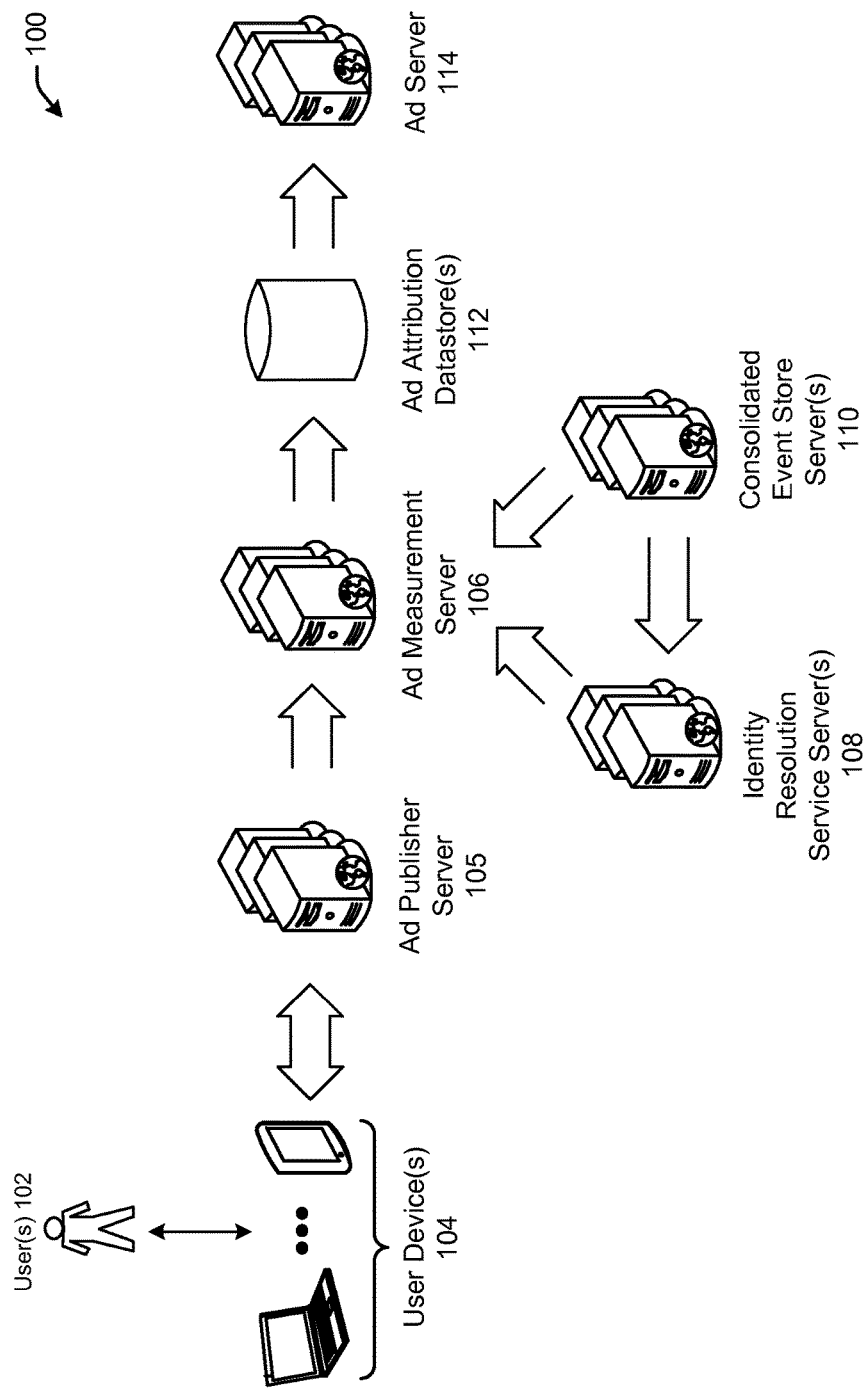
FIG. 1 depicts an illustrative data flow between various components of an illustrative system architecture for cross-channel online advertising attribution in accordance with one or more embodiments of the disclosure.

This disclosure relates to, among other things, systems, methods, computer-readable media, techniques, and methodologies for cross-channel online advertisement ("ad") attribution. Advertisers may develop ad campaigns to deliver advertisements to users. The advertisements may be delivered through different channels on different user devices. For example, advertisements may be delivered through email marketing, search engine marketing, social media marketing, many types of display advertising, and mobile advertising. The systems and methods described herein enable measurement of the exposure of a user to advertising campaigns across different channels (e.g., websites accessed by web browsers of laptops, desktops, or mobile computers, electronic readers or tablets, applications on mobile devices, and the like) and credit the exposure of the user to the advertisement to a specific advertisement in the campaign along with subsequent shopping events generated by the user (e.g., visiting product detail pages, visiting the read all reviews page for a product, watching a digital video stream, listening to a digital audio stream, adding a product to a wish list, adding a product to a shopping cart, subscribing to a product through an online subscription service, purchasing a product, subscribing to a service (e.g., online retail membership with free or reduced fee shipping), and/or enrolling in a promotional program (e.g., online retail membership program for a specialized subset of users, such as students, parents, etc.). In some embodiments, non-shopping events may be measured using a pixel on a webpage. In some embodiments, users may be recognized by the system and data may be collected across multiple channels as the user is exposed to advertisements. The users may generate shopping events and non-shopping events in different channels. Shopping events may be measurement for products promoted directly by an advertisements of an advertisement campaign as well as products which are associated with the promoted products (e.g., same brand) and are found in the same categories as the promoted products. In some embodiments, the exposure of an individual user to an advertisement or advertisement campaign may be measured across multiple channels. Additionally, shopping events, non-shopping events, and conversion events generated by a user may also be measured across multiple channels.

The cross-channel advertisement attribution system enables attribution of advertisement traffic events (e.g., ad views, ad clicks, etc.) with subsequent conversion events Examples of conversion events may include product purchases and glance views, as well as other activities such as mobile application downloads, application initiations and program enrollment. For purchase events, additional information, such as order product sales (OPS) and units ordered, may also be captured. In some embodiments, the cross-channel advertisement attribution system may provide third party advertisers with a conversion pixel to measure their specific success events, such as a marketing landing page visit or "learn more" button click on their website's homepage. Ad attribution may connect ad traffic events from any device with conversion events from any device, even when the devices are different.

The cross-channel advertisement attribution system may be positioned within a larger data and business intelligence platform. The cross-channel advertisement attribution system may include one or more identity resolution service (IRS) server(s) and/or consolidated event store (CES) server(s). In some embodiments, the IRS server(s) and/or CES server(s) may provide identity mapping, ad attribution functionality, and campaign lift functionalities to drive customer-facing reports on advertising results.

In some embodiments, the cross-channel advertisement attribution system may be designed to process and store large amounts of dimension and time series data from other systems. Dimension data may include data that is associated with an advertising campaign. Examples of dimension data include the identity of the advertiser, advertisement budget, type of advertisements, channels to deliver the advertisements, the creative portion of the advertisements, and/or product identifier. Dimension data or dimensions may serve as the link between advertisement traffic events and the product that advertisements are promoting. The dimensions data store may include a mapping of advertisement traffic identifiers and product identifiers. Time series data may include all the data collected from different channels for a given time period.

In some embodiments, the IRS servers may store identity mappings across all media channels to provide point-in-time canonical anonymized user identifiers. The IRS servers may generate a canonical identifier using multiple anonymized identifiers associated with users and identified from the raw data (e.g., session cookies, ad server cookies, etc.) obtained through the cross-channel advertisement attribution system. In some embodiments, the IRS servers may map the anonymized user identifiers to create a unified, canonical identifier and may maintain the canonical identifier and related mappings for a period of time (e.g., 30 days), enabling the cross-channel advertisement attribution system to connect user shopping events with subsequent conversion events (e.g., product purchase) even if the events occurred sometime later (e.g., up to 30 days later). In some embodiments, the user does not need to be explicitly logged into an account when generating the shopping events.

For example, a user who has not recently authenticated on a website may view an advertisement while browsing on their smartphone. The same user may later use a different device, such as a tablet, to visit the product promoted in the advertisement and then purchase the product from the website viewed earlier. The IRS server may resolve the identity of user for both sessions and devices to credit the mobile ad view with the tablet product purchase.

In another example, a user may click on an advertisement shown in a third party application on the smartphone of the user. The ad click may launch a mobile web browser on smartphone to a product detail page where the user may proceed to purchase the promoted product. The IRS Server may resolve the identity of the user for the third party application and the mobile web browser session on the website to credit the application ad view with the browser-based purchased. In both of these examples, IRS uses event data already captured and may not require pixels or URL encodings to credit advertisements with conversions.

The CES servers may retains advertisement traffic records for an identified period (e.g., 3 months). In some embodiments, the advertisement traffic records may be sorted by the user identifiers provided by the IRS servers. The CES servers may provide advertisement traffic event lookup capabilities for the attribution and campaign lift functions.

In some embodiments, raw data may be processed by the cross-channel advertisement attribution system in multiple iterations. For example, data may be processed once an hour, once a day, and once a week for an identified time period so that any data that may have been received from one of multiple channels at a later point in time may still be incorporated in the attribution analysis. By ensuring that data is processed in several iterations at different time intervals, data may be healed without having to backfill or constantly reprocess in response to receiving data. Additionally, by having data processed in several iterations in different time intervals, the processed data may be reported real time or near real-time so that modifications and adjustments may be made to ad campaigns using relevant data.

In some embodiments, the processed data may generate conversion facts and aggregated facts. Conversion facts are processed data that indicate relationships between or among events that led to a conversion event. One or more machine-learning/model building servers may use conversion facts to train or build models that may be used to determine how to attribute conversion events to advertisements. For example, the cross-channel advertisement attribution system may utilize one or more attribution models which may have different product engagement scopes, such as the product identifier scope, the order product sales (OPS) scope, or the brand scope.

An example of an ad attribution model is the "last-touch" model, which prioritizes ad clicks over ad views within an attribution window (e.g., predetermine period of time, such as 14-days or 30 days). The attribution window may indicate to the model how far back in time to search data before an identified conversion event to identify an advertisement that may receive credit for the conversion. In some embodiments, attribution windows may be designated by an administrator of the system for a set number of days. (e.g., 14 days, 30 days, etc.). In some embodiments, the cross-channel online advertisement attribution system may support ad click and approximate ad view windows from 1 days to 29 days. When there is an ad click within the attribution window, the "last ad clicked" may receive full credit for the conversion. Otherwise, the "last ad viewed" within the attribution window may have a chance to receive full credit.

In some embodiments, in an attribution model the ad attribution functionality may include a product engagement scope that enables the system to credits ads with conversion events across product identifiers, brand name of products or OPS. The product identifier and brand scopes may be used to credit ads with both product identifier level conversion events and brand level conversion events. For example, an ad campaign associated with product identifier A and the brand name associated with product identifier A is Brand X. Brand X may be found as the brand name for two other product identifiers: product identifier B and product identifier C. When product identifier A is purchased after an ad from the campaign is viewed, the methodology may credit the campaign with the product identifier A purchase using the product identifier scope. When product identifier B is purchased after an ad is viewed, and no other campaign is associated with product identifier B, then the methodology may credit the campaign with a Brand X purchase using the brand scope.

The OPS scope may be used to credit ads running with the total Ordered Product Sales of an entire shopping cart of a purchase after a user has interacted with an ad (e.g., ad click, ad view, et.). The OPS scope does not require nor use product identifier association with the ad campaign to drive attribution. The OPS scope may credit all purchases made with a particular product with an identified product identifier to the campaign.

In some embodiments, ad attribution models may also include mechanisms for secondary or below-the-fold (BTF) advertisement discounting. A BTF advertisement discounting model may reduce the probability that BTF ads receive credit for a conversion event. The BTF ad discounting model does not affect the last-touch, click-precedent approach of an attribution model. The BTF discounting model may be applicable to all conversion event types. The discounting model may be used when the "last ad viewed" is a BTF ad to ensure that a BTF is less likely to receive credit for a conversion than a primary advertisement or above-the-fold advertisement.

In some embodiments, a media channel scope may determine how ads served on different media channels are credited. A "channel" may combine a device with software (e.g. "mobile web browser" is a different channel from "mobile web app"). Some attribution models may support single-channel attribution and/or multi-channel attribution. In multi-channel attribution, ads from all channels are analyzed together. In single-channel, different channel groupings may be measured independently. For example, when both mobile web browser ad and a desktop web browser ad could be credited with a purchase, the "single channel methodology" may credit both ads, whereas the multi-channel methodology would only credit either the mobile web browser ad or the desktop web browser ad.

In some embodiments, the cross-channel advertisement attribution system may also provide a campaign lift function for ad campaigns based on conversion events, product sales and product scopes. The systems may identify a control group for an identified time period. The control group have different criteria, such as the control group size being equal to the ad exposure group size for the identified time period; the members of the control group have visited an identified website but have not been exposed to an advertisement for an ad campaign within a predetermined time period; and the distribution of the control group across the propensity to see an advertisement is equivalent to exposure group. The system may capture the conversion event counts, OPS and size of each group (e.g., control group and exposed group) for each day of the advertisement campaign. The cross-channel advertisement attribution system may use the captured data to calculate an approximate change (e.g., increase) in sales as a result of the ad campaigns, as well as the probability of ads causing customers to perform upstream actions (e.g., visiting a detail page).

The terms "delivery of an advertisement," "delivery of an advertisement impression," "presentment of an advertisement impression," "serving an ad impression," or any other similar term may be used interchangeably throughout this disclosure.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Case and System Architecture

FIG. 1 depicts an illustrative data flow 100 between various components of an illustrative system architecture for cross-channel advertisement attribution in accordance with one or more embodiments of the disclosure.

One or more illustrative user devices 104 operable by one or more users 102 are illustratively depicted in FIG. 1 The user device(s) 104 may include any suitable device capable of receiving and rendering webpages and launching applications, where the webpages and applications may display one or more advertisements to be viewed by the user 102. The user device(s) 104 may include any suitable processor-driven computing device including, but not limited to, a smartphone or other cellular device, a tablet device, an electronic reader device, a desktop computing device, a laptop computing device, a gaming console, a multimedia content streaming device, a set-top box, wearable computers, and so forth. In certain example embodiments, the user device(s) 104 may include a television such as, for example, a smart TV, an Internet Protocol television (IPTV), or the like. For ease of explanation, the user device(s) 104 and the user(s) 102 may be described herein in the singular; however, it should be appreciated that multiple user devices 104 operable by multiple users 102 may be provided.

In various example embodiments, a user application (e.g., a browser application) executing on a user device 104 may communicate with an ad publisher server 105. The ad publisher server 105 may transmit advertisements to the user devices(s) 104 to be served or published to the user 102. The user device 104 may receive the advertisements and may display the advertisements to the user. In some embodiments, the advertisements may be displayed in conjunction with content the user is viewing or in some other context, such as email, text, banner advertisement, advertisement overlay, or the like. The user device 104 may track events ((e.g., shopping events, conversion events, etc.) once the advertisement has been displayed to the user 102 and may transmit the events to the ad publisher server 105. The ad publisher server 105 may then transmit the events to an ad measurement server 106.

In some embodiments, a single user 102 may operate multiple user devices 104. Each of the multiple user devices 104 may generate and store events in response to the user 102 using the user device 104. Events may be generated when a user checks their email, launches an application, navigates to a web page, purchases an item from a webpage, view product details on a webpage, and the like. All the events generated by each of the user device(s) 104 may be transmitted to an ad publisher server 105.

An ad measurement server 106 may receive the data (e.g., raw event data) from one or more user device(s) 104 and may facilitate processing the data. The ad measurement server 106 may transmit all or a portion of the received raw event data to one or more identity resolution service (IRS) servers 108 and/or one or more consolidated event store (CES) servers 110.

In some embodiments, the IRS servers 108 may process the raw event data and identify a user and associate events with the user. The IRS servers 108 may store identity mappings across all media channels to provide point-in-time canonical anonymized user identifiers. The IRS servers 108 may generate a canonical identifier using multiple anonymized identifiers associated with users and identified from the raw data (e.g., session cookies, ad server cookies, etc.) obtained through the cross-channel advertisement attribution system. In some embodiments, the IRS servers 108 may map the anonymized user identifiers to create a unified, canonical identifier and may maintain the canonical identifier and related mappings for a period of time (e.g., 30 days), enabling the cross-channel advertisement attribution system to connect user shopping events with subsequent conversion events (e.g., product purchase) even if the events occurred sometime later (e.g., up to 30 days later). In some embodiments, the user does not need to be explicitly logged into an account when generating the shopping events.

In some embodiments, the CES servers 110 may process the raw event data and identify ad traffic events (e.g., shopping events, non-shopping events, conversion events, etc.). The CES servers 110 may retain advertisement traffic records for an identified period (e.g., 3 months). In some embodiments, the advertisement traffic records may be sorted by the user identifiers provided by the IRS servers. The CES servers 110 may provide advertisement traffic event lookup capabilities for the attribution and campaign lift functions.

The IRS servers 108 and/or the CES servers 110 may transmit the processed data (e.g., identity mappings, canonical identifiers, ad traffic events) to the ad measurement server 106. The ad measurement server 106 may receive the processed data and may use the processed data to identify a conversion event and to identify an advertisement that should be attributed with the conversion event. The ad measurement server 106 may be able to identify conversion events that should be attributed to advertisement across different channels. The ad measurement server 106 may then transmit the processed data, attribution data generated in attributing a conversion event to the advertisement, and/or raw data to an ad attribution datastore 112. The ad attribution datastore may be accessed by one or more servers, such as the ad server 114, for further processing or reporting. For example, the attribution data may be used to adjust ongoing ad campaigns to increase their effectiveness. Additionally, ad attribution data may be used to further develop and/or refine attribution models to be used on future iterations of processing data.

Figure 2:
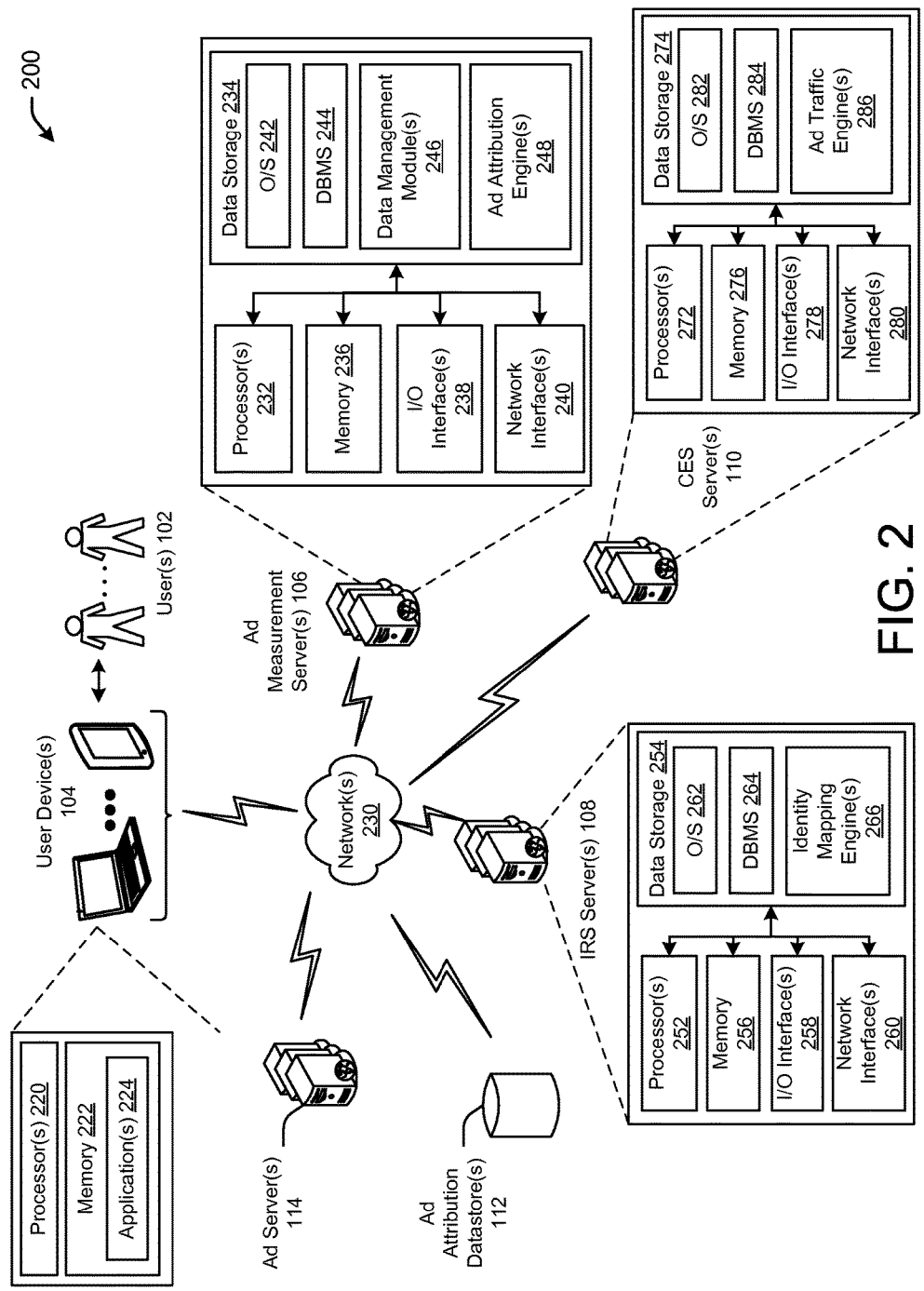
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture 200 depicted in FIG. 1 in accordance with one or more embodiments of the disclosure. FIG. 2 includes a user device 104, an ad measurement server 106, an IRS server 108, a CES server 110, an ad attribution datastore 112, and an ad server 114. Each component may be connected via network 230.

Any of the user device(s) 104, ad measurement server(s) 106, IRS server(s) 108, CES server(s) 110, ad attribution datastore(s) 112, and/or ad server(s) 114 may be configured to communicate with each other and any other component of the architecture 200 via one or more network(s) 230. The network(s) 230 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 230 may have any suitable communication range associated therewith and may include, for example, global networks (e.g., the Internet), metropolitan area networks (MANs), wide area networks (WANs), local area networks (LANs), or personal area networks (PANs). In addition, the network(s) 230 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Referring now to the user device 104, the user device 104 may include one or more processor(s) 220 and one or more memory devices 222 with a user application 224 stored thereon. The user device 104 may also include various additional components, such as one or more input device(s), I/O interface(s), radio/antennas, network interface(s), and other components. The user device 104 may also include an operating system configured to provide an interface between software and hardware resources of the user device 104, and/or database management systems configured to support functionality of the memory 222. The user device 104 may include system busses that functionally couple various components of the user device 104. In other embodiments, the user device 104 may include additional or fewer components.

The memory 222 may include one or more program modules, applications, or the like, such as the user application 224. One or more user applications 224 may be loaded into the memory 222. The user applications 224 may be any application(s) capable of facilitating the display of or otherwise presenting advertisement impressions to the user 102. The user applications 224 may include, but are not limited to, a web-based browser application, a dedicated software application (e.g., a smart phone application, a tablet application, etc.), a mobile browser application, and so forth. The user application 224 may be configured to render web pages on a respective user device 104. Any data may be loaded into the memory 222 for use by the processor(s) 220 in executing computer-executable code. The user device 104 may be configured to access, store, and/or retrieve data in or from one or more datastore(s). The user device 104 may also include communications connection(s) that allow the user device 104 to communicate with datastores, other computing devices or servers, user terminals, and/or other devices via the network(s) 230.

The user device 104 may be any suitable user device including, but not limited to, a mobile device, such as a smartphone, tablet, e-reader, or the like; a desktop computer; a laptop computer, a game console, a personal media player, a wearable computer device, and so forth. The user device 104 may be configured to present or serve ad impressions to users 102. The user device 104 may be configured to operate in various operational modes and may be configured to present electronic content and ad impressions.

The ad measurement server 106 may be any suitable device including, but not limited to, a mobile device such as a smartphone, tablet, e-reader, or the like; a desktop computer; a laptop computer, a game console, a personal media player, a wearable computer device, and so forth. The ad measurement server 106 may be configured to obtain data from different sources, such as one or more user device(s) 104, data server(s), and/or data store(s). The data may be raw event data that may include information associated with users, devices, shopping events, non-shopping events, conversion events, advertisements, ad traffic data, and the like. The ad measurement server 106 may facilitate processing of the received data by the IRS server(s) 108 and/or CES server(s) 110 and may receive the processed information from the IRS server(s) 108 and/or CES server(s) 110. The ad measurement server 106 may use the processed information to identify and attribute conversion events, such as a product purchase or product page view, to an ad of an advertisement campaign. The raw data, processed data, and attribution data may be transmitted to the ad attribution datastore 112 for storage and use by other devices.

Now referring to the ad measurement server 106, ad measurement server 106 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the ad measurement server 106, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The ad measurement server 106 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The ad measurement server 106 may further include network interface(s) 240 that facilitate communication between the ad measurement server 106 and other devices of the illustrative system architecture 200 (e.g., user device(s) 104, ad server 114, etc.) or application software via the network(s) 230. The ad measurement server 106 may additionally include one or more input/output (I/O) interfaces 238 (and optionally associated software components such as device drivers) that may support interaction between a user 102 and a variety of I/O devices, such as a keyboard, a mouse, a pen, a pointing device, a voice input device, a touch input device, a gesture capture or detection device, a display, speakers, a camera, a microphone, a printer, and so forth.

Referring again to the data storage 234, various program modules, applications, or the like may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the ad measurement server 106 and the hardware resources of the ad measurement server 106. More specifically, the O/S 242 may include a set of computer-executable instructions for managing the hardware resources of the ad measurement server 106 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores (e.g., ad attribution datastore 112). The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more data management modules 246, and/or one or more ad attribution engine(s) 248.

The data management module(s) 246 may include computer-executable instructions that in response to execution by the processor(s) 232 cause operations to be performed including receiving or otherwise obtaining raw data from one or more sources, such as user device(s) 104, datastores, server(s) and the like. The data management module 246 may facilitate processing of the raw data by transmitting a subset of the raw data to an IRS server 108 and/or a CES server 110 for processing. The data management module 246 may receive data from the IRS server 108 and/or CES server 110 and may transmit or otherwise make available the data to the ad attribution engine 248. In some embodiments, the data management module 246 may also facilitate transmission of data (e.g., raw and/or processed) to one or more datastores, such as the ad attribution datastore 112, for storage.

The ad attribution engine 248 may include computer-executable instructions that upon execution by the processor(s) 232 configures the processor(s) 232 to obtain or otherwise receive processed data from the data management module 246. The ad attribution engine 248 may use one or more ad attribution models to further process the data received from the IRS server(s) 108 and/or CES server(s) 110 to identify conversion events and attribute the identified conversion events to one or more advertisements. In some embodiments, the ad attribution engine 248 may execute one or more attribution models in parallel. In some embodiments, the ad attribution engine 248 may execute one or more product engagement scopes within the attribution model to generate different types of attribution data. Attribution models and product engagement scopes are discussed further in relation to FIG. 3.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The IRS server(s) 108 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the IRS server(s) 108, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The IRS server(s) 108 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The IRS server(s) 108 may further include network interface(s) 260 that facilitate communication between the IRS server(s) 108 and other devices of the illustrative system architecture 200 (e.g., user device(s) 104, ad server 114, etc.) or application software via the network(s) 230. The IRS server(s) 108 may additionally include one or more input/output (I/O) interfaces 258 (and optionally associated software components such as device drivers) that may support interaction between a user 102 and a variety of I/O devices, such as a keyboard, a mouse, a pen, a pointing device, a voice input device, a touch input device, a display, speakers, a camera, a microphone, a printer, and so forth.

Referring again to the data storage 254, various program modules, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the IRS server(s) 108 and the hardware resources of the IRS server(s) 108. More specifically, the O/S 262 may include a set of computer-executable instructions for managing the hardware resources of IRS server(s) 108 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores. The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more identity mapping engine(s) 266.

The identity mapping engine 266 may include computer-executable instructions, code, or the like, that, responsive to execution by the processor(s) 252, may cause the identity mapping engine 266 to store identity mappings across all media channels to provide point-in-time canonical anonymized user identifiers. The identity mapping engine 266 may generate a canonical identifier using multiple anonymized identifiers associated with users and identified from the raw data (e.g., session cookies, ad server cookies, etc.) obtained through the cross-channel advertisement attribution system. In some embodiments, the identity mapping engine 266 may map the anonymized user identifiers to create a unified, canonical identifier and may maintain the canonical identifier and related mappings for a period of time (e.g., 30 days), enabling the cross-channel advertisement attribution system to connect user shopping events with subsequent conversion events (e.g., product purchase) even if the events occurred sometime later (e.g., up to 30 days later). In some embodiments, the user does not need to be explicitly logged into an account when generating the shopping events. The identity mappings may then be transmitted back to the ad measurement server 106 for further processing.

Within the data storage 254, one or more modules may be stored. As used herein, the term module may refer to a functional collection of instructions that may be executed by the one or more processor(s) 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The CES server(s) 110 may include one or more processors (processor(s)) 272) and one or more memories 276 (referred to herein generically as memory 276). The processor(s) 272 may include any suitable processing unit capable of accepting digital data as input, processing the input data based on stored computer-executable instructions, and generating output data. The computer-executable instructions may be stored, for example, in the data storage 274 and may include, among other things, operating system software and application software. The computer-executable instructions may be retrieved from the data storage 274 and loaded into the memory 276 as needed for execution. The processor(s) 272 may be configured to execute the computer-executable instructions to cause various operations to be performed. The processor(s) 272 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 274 may store program instructions that are loadable and executable by the processor(s) 272, as well as data manipulated and generated by the processor(s) 272 during execution of the program instructions. The program instructions may be loaded into the memory 276 as needed for execution. Depending on the configuration and implementation of the ad exchange server(s) 108, the memory 276 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 276 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The CES server(s) 110 may further include additional data storage 274 such as removable storage and/or non-removable storage including, but not limited to, magnetic storage, optical disk storage, and/or tape storage. Data storage 274 may provide non-volatile storage of computer-executable instructions and other data. The memory 276 and/or the data storage 274, removable and/or non-removable, are examples of computer-readable storage media (CRSM).

The CES server(s) 110 may further include network interface(s) 280 that facilitate communication between the CES server(s) 110 and other devices of the illustrative system architecture 200 (e.g., user device(s) 104, ad server 114, etc.) or application software via the network(s) 230. The CES server(s) 110 may additionally include one or more input/output (I/O) interfaces 278 (and optionally associated software components such as device drivers) that may support interaction between a user 102 and a variety of I/O devices, such as a keyboard, a mouse, a pen, a pointing device, a voice input device, a touch input device, a gesture capture or detection device, a display, speakers, a camera, a microphone, a printer, and so forth.

Referring again to the data storage 274, various program modules, applications, or the like may be stored therein that may comprise computer-executable instructions that when executed by the processor(s) 272 cause various operations to be performed. The memory 276 may have loaded from the data storage 274 one or more operating systems (O/S) 282 that may provide an interface between other application software (e.g., dedicated applications, a browser application, a web-based application, a distributed client-server application, etc.) executing on the CES server(s) 110 and the hardware resources of the CES server(s) 110. More specifically, the O/S 282 may include a set of computer-executable instructions for managing the hardware resources of the CES server(s) 110 and for providing common services to other application programs (e.g., managing memory allocation among various application programs). The O/S 282 may include any operating system now known or which may be developed in the future including, but not limited to, any mobile operating system, desktop or laptop operating system, mainframe operating system, or any other proprietary or open-source operating system.

The data storage 274 may further include one or more database management systems (DBMS) 284 for accessing, retrieving, storing, and/or manipulating data stored in one or more datastores. The DBMS 284 may use any of a variety of database models (e.g., relational model, object model, etc.) and may support any of a variety of query languages.

The data storage 274 may additionally include various other program modules that may include computer-executable instructions for supporting a variety of associated functionality. For example, the data storage 274 may include one or more ad traffic engine(s) 286.

The ad traffic engine 286 may include computer-executable instructions, code, or the like, that, responsive to execution by the processor(s) 272, may cause the CES server(s) 110 to retain advertisement traffic records for an identified period (e.g., 3 months). In some embodiments, the advertisement traffic records may be sorted by the user identifiers provided by the IRS servers 108. The ad traffic engine 286 may provide advertisement traffic event lookup capabilities for the attribution and campaign lift functions. In some embodiments, the ad traffic engine 286 may process the raw data received from the ad measurement server 106 to identify and store advertisement traffic data. The advertisement traffic data may then be transmitted back to the ad measurement server 106 for further processing.

Within the data storage 274, one or more modules may be stored. As used herein, the term module may refer to a functional collection of instructions that may be executed by the one or more processor(s) 272. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The ad attribution datastore 112 may be accessible by components of the system 200 to provide information generated by the ad measurement server 106, IRS server 108, and/or CES server 110. While the illustrated embodiment depicts a certain number of components, other embodiments may include additional or fewer ad servers and/or aggregation servers or other components.

The ad server 114 may be any server in the fleet of servers associated with advertisements, such as an ad exchange server, an ad campaign server, a website/ad publisher server, an attribution model server, or the like. The ad server 114 may access data from the ad attribution datastore 112 for further processing or usage. For instance, the ad server 114 may be an attribution model server that uses the data stored in the ad attribution datastore 112 to generate or further develop attribution models by applying one or more machine learning algorithms to the data to train the models to generate more accurate attribution of conversion events to advertisements. In some embodiments, the ad server 114 may be an ad campaign server which may use the information from the ad attribution datastore 112 to adjust or modify parameters associated with an ad campaign to increase its efficiency and effectiveness.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Illustrative Data Flow

Figure 3:
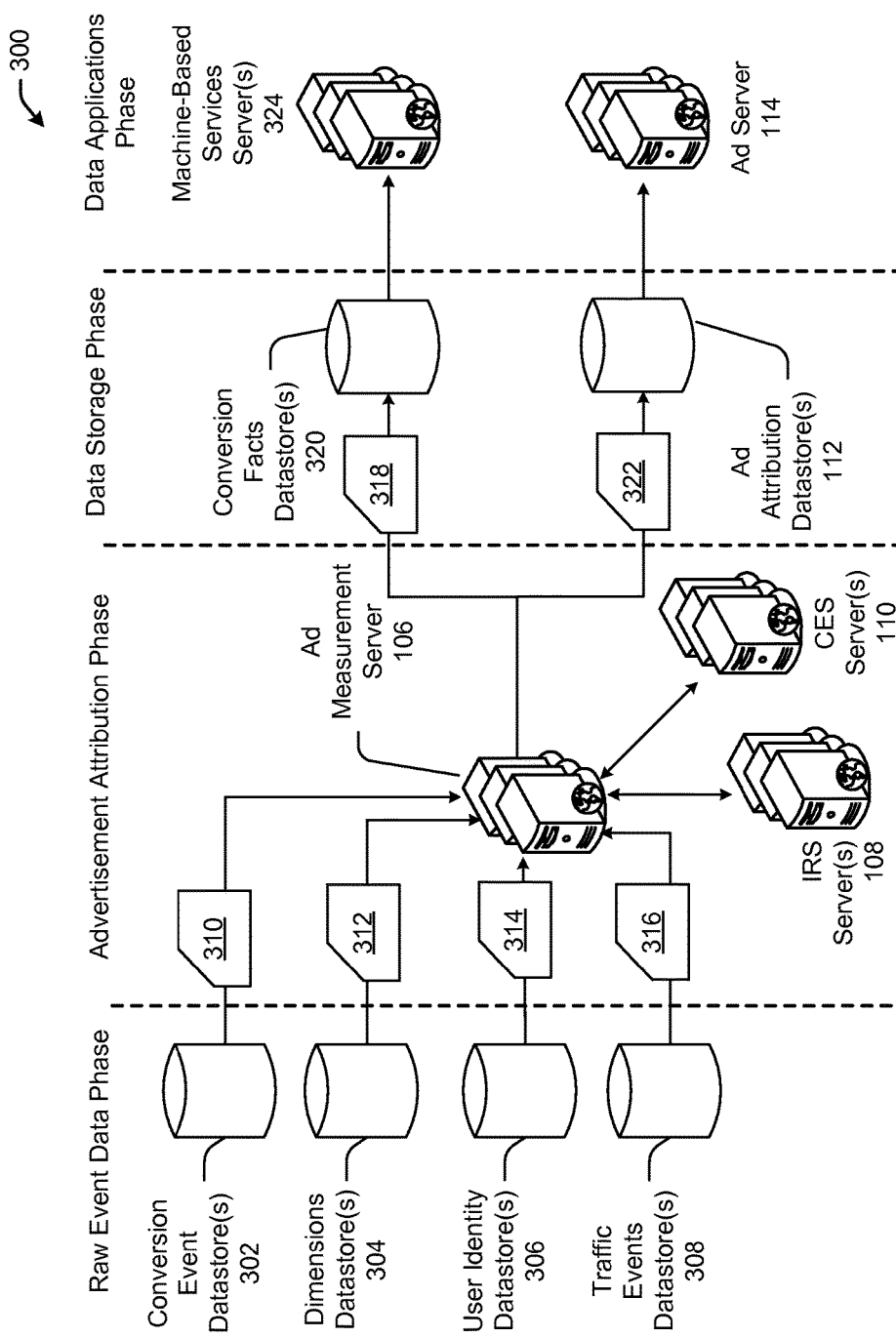
FIG. 3 is an example data flow of a system for cross-channel online advertising attribution in accordance with one or more embodiments of the disclosure.

FIG. 3 is an example data flow 300 of a system for cross-channel online advertising attribution in accordance with one or more embodiments of the disclosure. In some embodiments, the cross-channel online advertising attribution system may be portioned into four phases—the raw event data phase, the advertisement attribution phase, the data storage phase, and the data applications phase.

The raw event data phase may include obtaining raw event data from different sources. Raw event data may be generated by different devices and servers, such as laptops, smartphones, tablets, web servers, or the like. Raw event data may include conversion events 310, dimension data 312, identity mapping data 314, and/or ad traffic data 316, which may be generated and stored in different datastores, such as conversion event datastore 302, dimensions datastore 304, user identity datastore 306, and traffic events datastore 308. In some embodiments, the raw event data may be processed to anonymize the data and remove personally identifiable information from the system. Large quantities of data for many users may be generated by different systems. For example, an e-commerce system responsible for an online distributor may generate ecommerce events associated with transactions generated by users 102 on their websites and/or mobile applications. In some embodiments, back end data services may collect and provide identifiers associated with users 102 and user devices 104. Such information may also include session information, hardware information, and the like. Ad traffic events may include ad impression that were delivered to users 102 and any subsequent events generated by the user 102, such as selecting or clicking an ad, viewing a details page, adding a product to a shopping cart, adding the product to a wish list, or the like.

During the advertisement attribution phase, the raw event data (e.g., 310, 312, 314, 316) may be transmitted to an ad measurement server 106. The ad measurement server 106 may schedule and manage transmission of data for further processing. For example, the ad measurement server 106 may transmit all or a portion of the raw event data to an IRS server 108 and/or CES server 110 for further processing. The ad measurement server 106 may receive processed data back from the IRS servers 108 and/or CES servers 110, such as conversion facts 318 and/or aggregated facts 322. The ad measurement server 106 may apply one or more attribution models to the data received from the IRS servers 108 and/or CES servers 110 and may be able to identify a conversion event from the conversion facts 318 and can attribute the conversion event to an advertisement from the aggregated facts 322.

In the data storage phase, the ad measurement server 106 may transmit the conversion facts to a conversion facts datastore 320 for storage, whereas the aggregated facts 322 may be transmitted to an ad attribution datastore 112 for storage. In the data applications phase, one or more computers, such as an ad server 114 or machine-based services server 324 may access stored data for further processing. For example, the machine-based services server 324 may obtain conversion facts 318 from the conversion facts datastore 320 to apply machine learning algorithms to build and/or refine attribution models to use in later processing of raw event data. In another example, the machine-based service server 324 may obtain conversion facts 318 from the conversion facts datastore 320 to apply machine learning algorithms to generate alarms that may be set and utilized to notify administrators of the system of different events. In another example, an ad server 114, such as an ad campaign server, may access aggregated facts 322 from the ad attribution datastore 112 to adjust or modify ad campaigns to increase their effectiveness. In another example, an ad server 114 may access data from the ad attribution datastore 112 and/or the conversion facts datastore 320 to generate one or more reports reflecting the effectiveness of an ad campaign, a current state of an ad campaign, and/or a path to purchase report, which may indicate when a user 102 views a product detail page, when users 102 add products to their cards, what types of devices are more likely to be used to view ads and what types of devices are more likely to be used to purchase products.

Illustrative Processes

Figure 4:
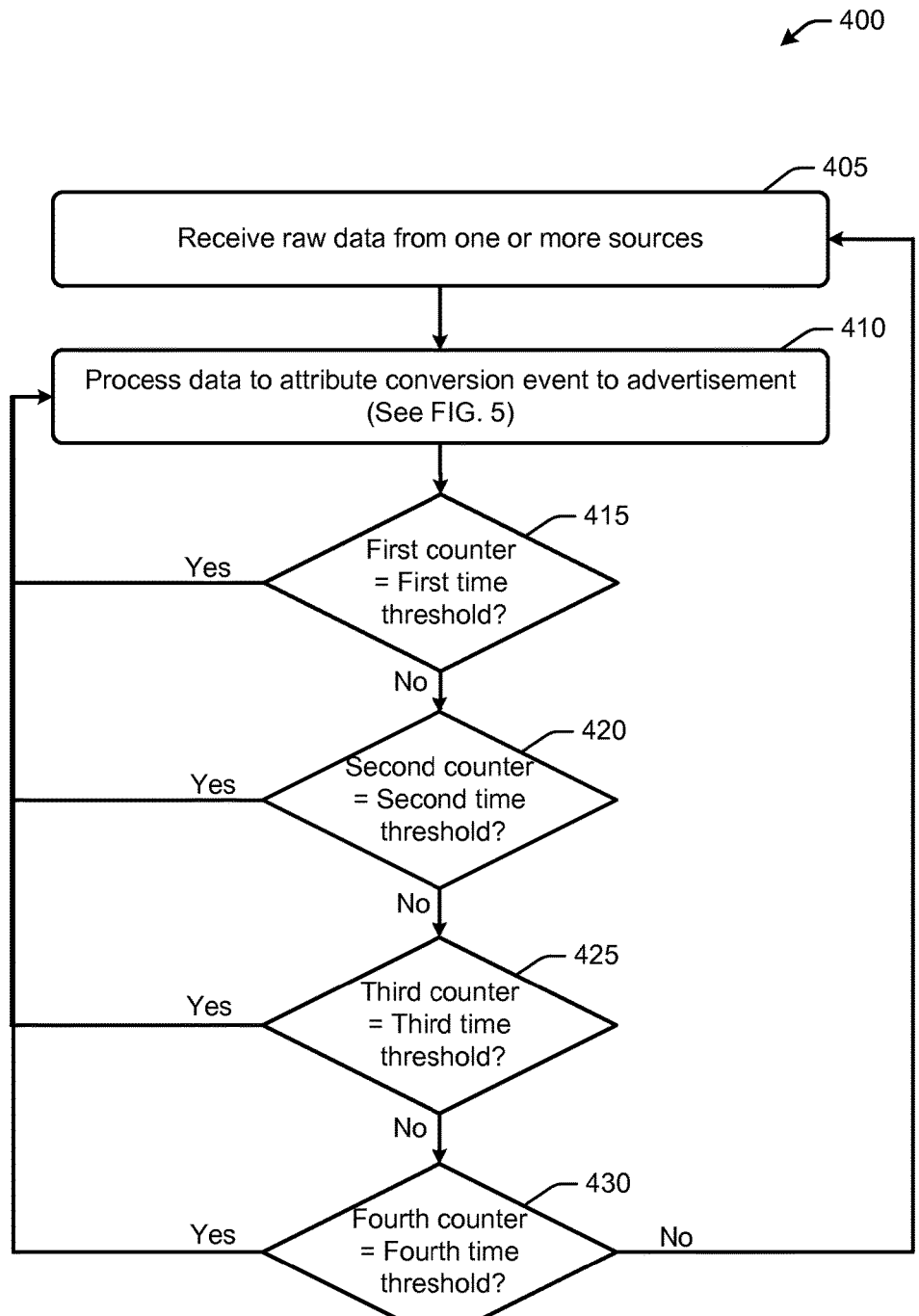
FIG. 4 is a process flow diagram of an illustrative method for iterative processing of data for cross-channel online advertising attribution in accordance with one or more embodiments of the disclosure.

FIG. 4 is a process flow diagram of an illustrative method 400 for iterative processing of data for cross-channel online advertising attribution in accordance with one or more embodiments of the disclosure. In some embodiments, the ad attribution engine 248 may process raw data in multiple iterations. For example, data for a specified time period (e.g., 30 days in the past from the current date) may be processed once an hour for 24 hours, once a day for 365 days, and once a week for 52 weeks of a year. Each time interval (e.g., hourly, daily, weekly) may be tracked by a separate counter and may be compared to one or more thresholds to ensure data is processed at regular intervals in multiple iterations. Each of the time intervals may be adjusted or modified by an administrator of the system (e.g., instead of hourly, every two hours, instead of daily, every other day, etc.). By continuously processing data at regular intervals, the system ensures that data may be healed without having to backfill or constantly reprocess in response to receiving data. The data may be "broken" when data from one of the multiple channels has not been obtained or processed. When the missing data is received, the data may be processed in one of the iterations, thus completing the data set and "healing" the data. By having multiple iterations of processing at different time intervals, the system also provides a mechanism to ensure continuity of data, so that if one processing job fails (e.g., due to technical issues, power outage, etc.), self-heal reporting is accomplished so that no additional processing needs to rushed to be completed. Additionally, by having data processed in several iterations in different time intervals, the processed data may be reported real time or near real-time so that modifications and adjustments may be made to ad campaigns using relevant data. Reports may be dependent on the attribution model selected to process the data, the product engagement scope selected, and the like. Some reports may be high level reports that indicate the parameters of an ad campaign (e.g., budget, timing, etc.) and metrics indicative of a current state of performance in the context of the ad campaign. In some embodiments, reports may include a path to purchase report that indicate the kind of ads people are interacting with across the entire chain of events. For example, the path to purchase report may indicate when a user views a product detail page, when users add products to their cards, what types of devices are more likely to be used to view ads and what types of devices are more likely to be used to purchase products.

At block 405, the ad attribution engine 248 may receive raw data from one or more sources. As depicted in FIG. 3, raw data may include conversion events, dimension data, user identity data, and traffic events data. The raw data may be obtained from user devices 104, datastores, and/or servers.

At block 410, the ad attribution engine 248 may process the raw data to attribute an identified conversion event to an advertisement. In some embodiments, the ad attribution engine 248 may transmit all or some of the raw data received to an IRS server 108 and/or CES server 110 for processing. The ad attribution engine 248 may then receive the processed data from the IRS server 108 and/or CES server 110. Attributing an identified conversion event to an advertisement is discussed in further detail in relation to FIG. 5.

At block 415, the ad attribution engine 248 may determine whether a first counter is equal to a first time threshold. The first counter may be indicative of the length of time since data was processed in accordance with a first set of rules. The first threshold may indicate a weekly threshold. The first counter may be compared to the first threshold to determine if it has been a week since the last time data was processed for an identified period of time. If the first counter is equal to the first threshold, then the method may proceed back to block 410, where the data may be processed to attribute the identified conversion event to an advertisement. The data that is processed may include any additional raw data that has been received since the last time the data was processed for the iteration. If the first threshold is not equal to the first counter, then the method may proceed to block 420.

At block 420, the ad attribution engine 248 may determine whether a second counter is equal to a second time threshold. The second counter may be indicative of the length of time since data was processed in accordance with a second set of rules. The second threshold may indicate a daily threshold. The second counter may be compared to the second threshold to determine if it has been a day since the last time data was processed for the identified period of time. If the second counter is equal to the second threshold, then the method may proceed back to block 410, where the data may be processed to attribute the identified conversion event to an advertisement. The data that is processed may include any additional raw data that has been received since the last time the data was processed for the iteration. If the second threshold is not equal to the second counter, then the method may proceed to block 425.

At block 425, the ad attribution engine 248 may determine whether a third counter is equal to a third time threshold. The third counter may be indicative of the length of time since data was processed in accordance with a third set of rules. The third threshold may indicate an hourly threshold. The third counter may be compared to the third threshold to determine if it has been an hour since the last time data was processed for the identified period of time. If the third counter is equal to the third threshold, then the method may proceed back to block 410, where the data may be processed to attribute the identified conversion event to an advertisement. The data that is processed may include any additional raw data that has been received since the last time the data was processed for the iteration. If the third threshold is not equal to the third counter, then the method may proceed to block 415. The method will continue to cycle so that reports may be generated at different intervals of processing. In some embodiments, the method may have more or fewer iterations and may be designated by an administrator of the system.

Figure 5:
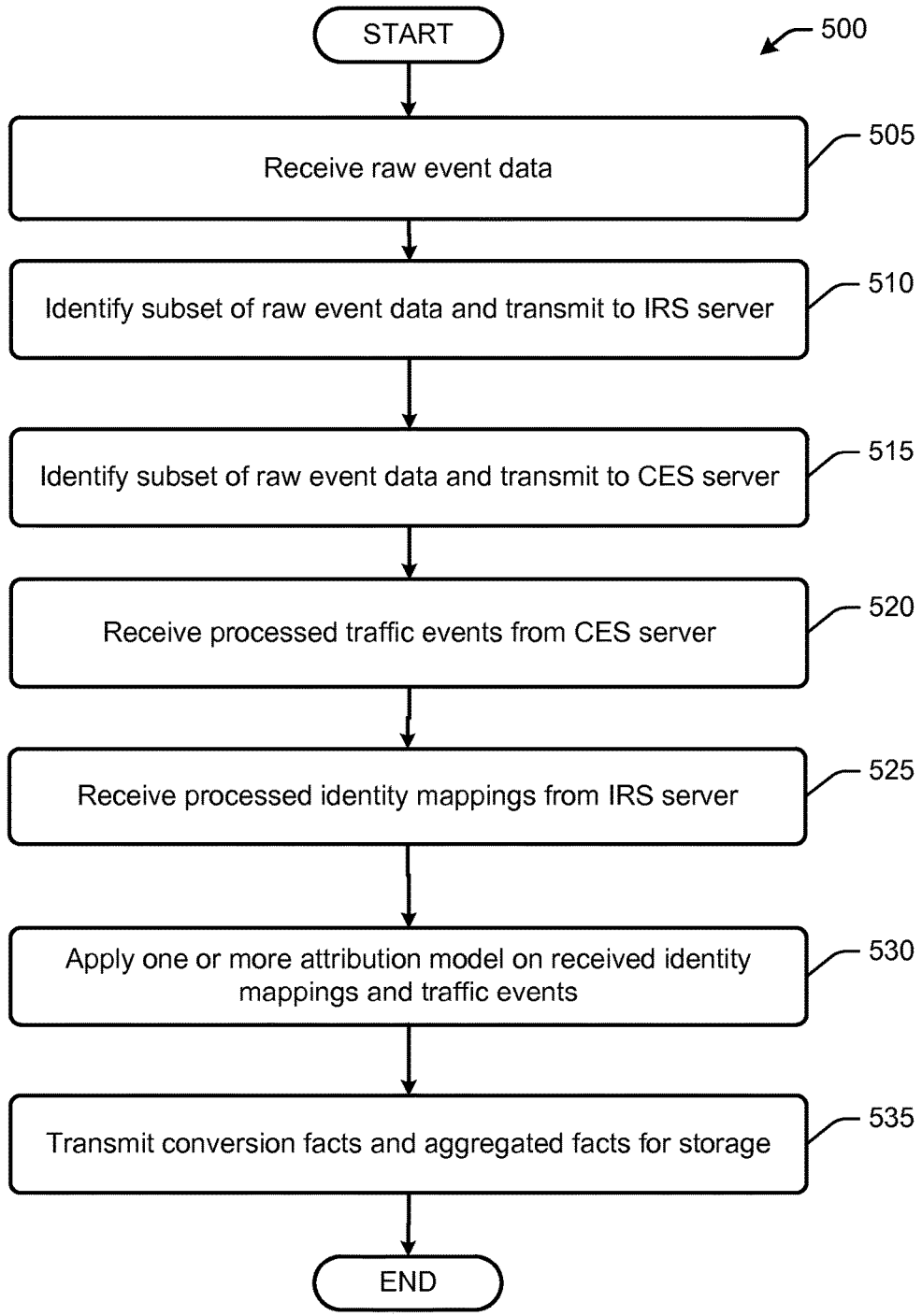
FIG. 5 is a process flow diagram of an illustrative method for cross-channel online advertising attribution in accordance with one or more embodiments of the disclosure.

FIG. 5 is a process flow diagram of an illustrative method 500 for cross-channel online advertising attribution in accordance with one or more embodiments of the disclosure.

At block 505, the ad attribution engine 248 may receive raw event data. As discussed, raw event data may include, for example, shopping events generated by the user 102 (e.g., visiting product detail pages, visiting the read all reviews page for a product, adding a product to a wish list, adding a product to a shopping cart, subscribing to a product through an online subscription service, and/or purchasing a product) and non-shopping events which may be measured using a pixel on a webpage. In some embodiments, users 102 may be recognized by the system and data may be collected across multiple channels as the user 102 is exposed to advertisements. The users 102 may generate shopping events and non-shopping events in different channels. Shopping events may be measurement for products promoted directly by an advertisements of an advertisement campaign as well as products which are associated with the promoted products (e.g., same brand) and are found in the same categories as the promoted products. In some embodiments, the exposure of an individual user to an advertisement or advertisement campaign may be measured across multiple channels. Additionally, shopping events, non-shopping events, and conversion events generated by a user 102 may also be measured across multiple channels. In some embodiments, the raw data may include conversion events 310, dimension data 312, id mapping data 314, and/or ad traffic events data 316.

Conversion event data 310 may include events that accomplish a goal set by an advertiser, such as increasing awareness of the ad campaign, increasing or improving consumer engagement, increasing product sales, and the like. Examples of conversion events may include product purchases and glance views, as well as other activities such as mobile application downloads and application initiations.

Dimension data 312 may include data that is associated with an advertising campaign. Examples of dimension data 312 include the identity of the advertiser, advertisement budget, type of advertisements, channels to deliver the advertisements, the creative portion of the advertisements, and/or product identifier. Dimension data 312 or dimensions may serve as the link between advertisement traffic events 316 and the product that advertisements are promoting. The dimensions data store 304 may include a mapping of advertisement traffic identifiers and product identifiers. Identity mapping data 314 may include identifiers associated with users 102 an user devices 104, such as session cookies, ad server cookies, session identifiers, hardware identifiers, hardware type, etc. Ad traffic events data 316 may include events generated by a user 102, such as shopping events (e.g., viewing a web page, clicking an advertisement, adding a product to a wish list, adding a product to a shopping cart, etc.). Time series data may refer to all raw event data collected from different channels for a given time period.

At block 510, the ad attribution engine 248 may transmit all or a portion of the raw event data to one or more IRS servers 108. In some embodiments, the IRS servers 108 may process the raw event data to identify identity mapping information 314 and may generate identity mappings across all media channels to generate a canonical anonymized user identifiers. The IRS servers 108 may generate a canonical identifier using multiple anonymized identifiers associated with users 102 and identified from the raw data obtained through the cross-channel advertisement attribution system.

At block 515, the ad attribution engine 248 may transmit all or a portion of the raw event data to one or more CES servers 110. A CES server 110 may process to the raw event data to identify events. All events (e.g., conversion events, shopping events, etc.) have an identifier that may be used to identify ad traffic events. The CES server 110 may retain ad traffic records for a predetermined period of time.

At block 520, the ad attribution engine 248 may receive processed traffic events data from the one or more CES servers 110. At block 525, the ad attribution engine 248 may receive processed identity mapping data from one or more IRS servers 108.

At block 530, the ad attribution engine 248 may apply one or more attribution models on the received identity mappings and traffic events. In some embodiments, the ad attribution engine 248 may identify a conversion event from the processed data. The ad attribution engine 248 may identify an ad impression from the processed data. The ad attribution engine 248 may apply one or more attribution models to determine whether the conversion event should be credited to the ad impression.

In some embodiments, an ad attribution model may utilize a "last-touch" approach, which prioritizes ad clicks over ad views within an attribution window (e.g., predetermine period of time, such as 14-days or 30 days). The attribution window may indicate to the model how far back in time to search data before an identified conversion event to identify an advertisement that may receive credit for the conversion. In some embodiments, attribution windows may be designated by an administrator of the system for a set number of days. (e.g., 14 days, 30 days, etc.). In some embodiments, the cross-channel online advertisement attribution system may support ad click and approximate ad view windows from 1 days to 29 days. When there is an ad click within the attribution window, the "last ad clicked" may receive full credit for the conversion. Otherwise, the "last ad viewed" within the attribution window may have a chance to receive full credit.

In some embodiments, in an attribution model the ad attribution functionality may include a product engagement scope that enables the system to credits ads with conversion events across product identifiers, brand name of products or OPS. The product identifier and brand scopes may be used to credit ads with both product identifier level conversion events and brand level conversion events.

The OPS scope may be used to credit ads running with the total Ordered Product Sales of an entire shopping cart of a purchase after a user has interacted with an ad (e.g., ad click, ad view, et.). The OPS scope does not require nor use product identifier association with the ad campaign to drive attribution. The OPS scope may credit all purchases made with a particular product with an identified product identifier to the campaign.

At block 535, the ad attribution engine 248 may transmit conversion facts and aggregated facts for storage. In some embodiments, the processed data may comprise conversion facts and aggregated facts. Conversion facts are processed data that indicate relationships between or among events that led to a conversion event. One or more machine-learning/model building servers may use conversion facts to train or build models that may be used to determine how to attribute conversion events to advertisements. For example, the cross-channel advertisement attribution system may utilize one or more attribution models which may have different product engagement scopes, such as the product identifier scope, the order product sales (OPS) scope, or the brand scope.

In some embodiments, the cross-channel advertisement attribution system may also provide a campaign lift function for ad campaigns based on conversion events, product sales and product scopes. The systems may identify a control group for an identified time period. The control group have different criteria, such as the control group size being equal to the ad exposure group size for the identified time period; the members of the control group have visited an identified website but have not been exposed to an advertisement for an ad campaign within a predetermined time period; and the distribution of the control group across the propensity to see an advertisement is equivalent to exposure group. The system may capture the conversion event counts, OPS and size of each group (e.g., control group and exposed group) for each day of the advertisement campaign. The cross-channel advertisement attribution system may use the captured data to calculate an approximate change (e.g., increase) in sales as a result of the ad campaigns, as well as the probability of ads causing customers to perform upstream actions (e.g., visiting a detail page).

Figure 6:
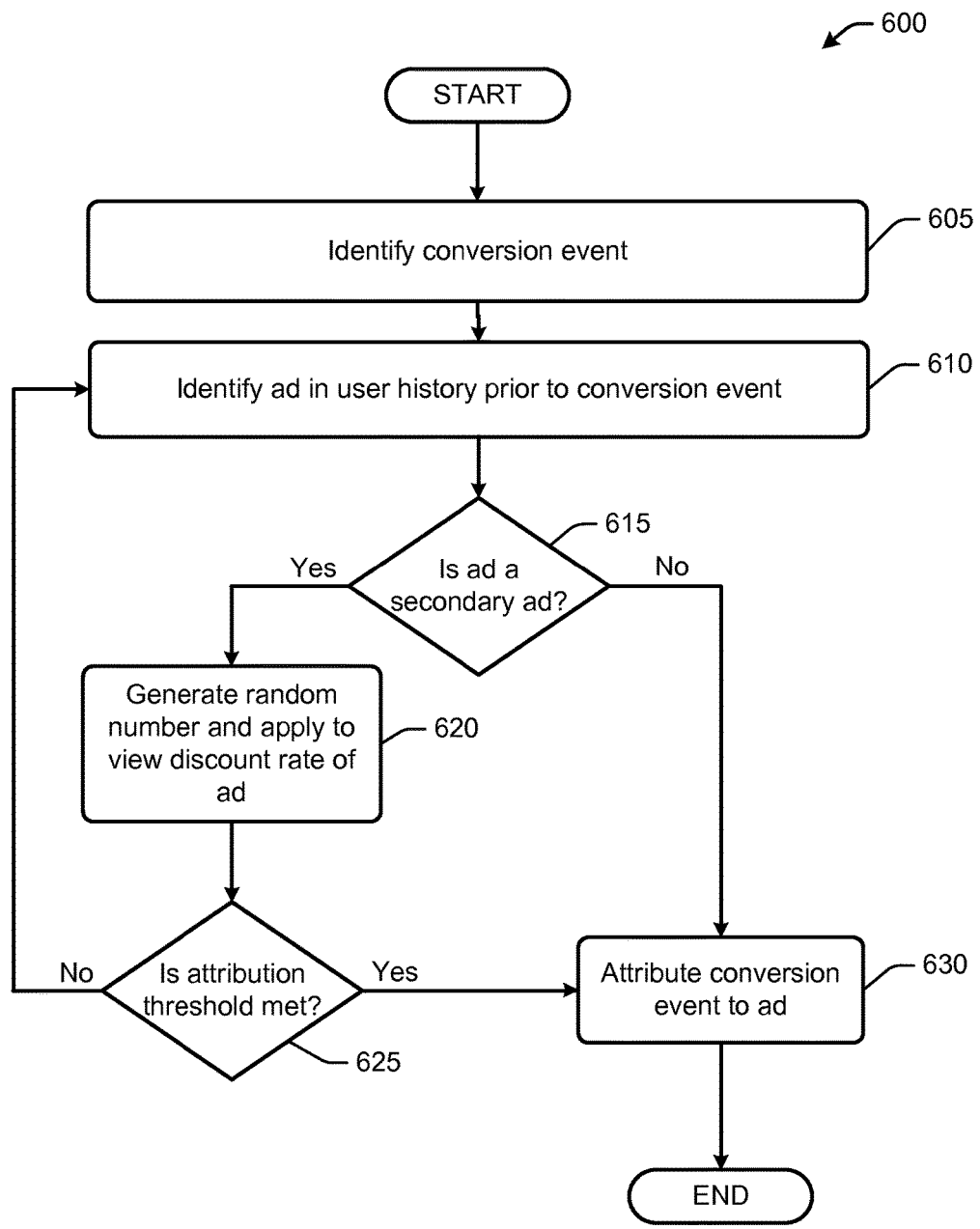
FIG. 6 is a process flow diagram of an illustrative method for attribution for secondary advertisements in association with online cross-channel online advertising attribution in accordance with one or more embodiments of the disclosure.

FIG. 6 is a process flow diagram of an illustrative method 600 for attribution for below the fold advertisement in association with online cross-channel online advertising attribution in accordance with one or more embodiments of the disclosure.

At block 605, the ad attribution engine 248 may identify a conversion event. The ad attribution engine 248 may identify the conversion event from time series data identified from raw data or processed data received from an IRS server 108 and/or CES server 110. At block 610, the ad attribution engine 248 may identify an advertisement in the user history that occurred prior to the conversion event. The ad attribution engine 248 may identify a date associated with the conversion event and may search data (e.g., data stored in the ad attribution datastore 112) for an advertisement or ad impression that may have been served to the user 102 (e.g., email marketing, advertisement displayed in ad slot included in content consumed by user 102, etc.) within an attribution window. An attribution window may be a period of time prior to the conversion event used to identify an advertisement that may receive credit for the conversion event. For example, the attribution window may be set to be two weeks prior to the conversion event. Accordingly, the attribution engine 248 would search data that was generated up to two weeks prior to the conversion event.

At block 615, the ad attribution engine 248 may determine whether the ad is a secondary ad (e.g., below the fold ad) or a primary ad (e.g., above the fold ad). A primary ad or above-the-fold ad is an advertisement that is visible in the viewable screen upon navigation to a website or launching of an application. A secondary ad or below-the-fold ad is an ad that is rendered but is not viewable by the user from the screen upon navigation to the website or launching of the application, until the user scrolls the window and the ad becomes visible to the user. The ad attribution engine 248 may determine whether the ad is a secondary ad or a primary ad by analyzing the metadata, label, and/or tag associated with the ad that indicates which type of advertisement it is. Alternatively, the ad attribution engine 248 may determine the type of ad by identifying where and/or how the ad is displayed to the user 102.

If the ad attribution engine 248 determines that the ad is a primary ad, then the method may proceed to block 630 where the ad attribution engine 248 attributes the conversion event to the advertisement. If the ad attribution engine 248 determines at block 615 that the ad is a secondary ad, then the method may proceed to block 620.

At block 620, the ad attribution engine 248 may generate a random number, such as between 0 and 1 and apply that generated number to a view discount rate associated with the ad. In some embodiments, an attribution probability may be determined by multiplying the random number and the view discount rate. A view discount rate may be a number between 0 and 1. The view discount rate may be designated in the ad campaign of the secondary ad.

At block 625, the ad attribution engine 248 may compare the product of the view discount rate and random number (e.g., attribution probability) to an attribution threshold. If the attribution threshold is met, then the method may proceed to block 630, where the conversion event may be attributed to the ad. If at block 625, the ad attribution engine 248 determines that the attribution threshold is not met, then the method may proceed back to block 610, where another ad is identified and proceeds through the method 600. The method may terminate when the conversion event is attributed to an identified ad.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:
    receiving, by a server comprising one or more computer processors, event data comprising a first set of data from a first user device and a second set of data from a second user device, the first user device and the second user device in communication with the server over a network;
    transmitting, by the server to an identity resolution service (IRS) server, the event data;
    transmitting, by the server to a consolidated event store (CES) server, the event data;
    receiving, by the server from the IRS server, identity mappings generated using the event data, wherein the identity mappings comprise a mapping of (i) anonymized identifiers associated with a user to (ii) identifiers associated with user devices;
    determining a canonical identifier that is associated with the identity mappings, wherein the canonical identifier comprises at least a portion of the anonymized identifiers;
    linking, based at least in part on the canonical identifier and the associated identity mappings, in a database, one or more shopping events in the event data with a conversion event, the canonical identifier identifying respective users of both the first user device and the second user device;
    receiving, by the server from the CES server, advertisement traffic events identified from the event data;
    determining that a first counter is not equal to a first threshold length of time;
    determining that a second counter is not equal to a second threshold length of time that is less than the first threshold length of time;
    determining that a third counter is equal to a third threshold length of time that is less than the second threshold length of time; and
    generating, by the server using one or more attribution models after the third counter equals the third threshold length of time, ad attribution data indicative of an attribution of the conversion event to an advertisement of an advertisement campaign.

2. The non-transitory computer-readable medium of claim 1, wherein the operations further comprise:
    transmitting, by the server, the ad attribution data to a datastore; and
    retrieving, by the server, the ad attribution data to generate a path to purchase report.

3. The non-transitory computer-readable medium of claim 1, wherein generating the ad attribution data further comprises:
    generating, by the server, the ad attribution data on an hourly, daily, and weekly basis.

4. The non-transitory computer-readable medium of claim 1, wherein the ad attribution data is generated using the event data from an attribution window.

5. A method comprising:
    receiving, by a server comprising one or more computer processors, event data from a first user device and a second user device in communication with the server over a network;
    transmitting, by the server, the event data to an identity resolution service (IRS) server;
    transmitting, by the server, the event data to a consolidated event store (CES) server;
    receiving, by the server from the IRS server, identity mappings generated using the event data, wherein the identity mappings comprise a mapping of anonymized identifiers associated with a user to identifiers associated with user devices;
    determining a canonical identifier, wherein the canonical identifier is associated with the identity mappings, wherein the canonical identifier comprises at least a portion of the anonymized identifiers;
    linking, based at least in part on the canonical identifier and the associated identity mappings, in a database, one or more shopping events in the event data with a conversion event, the canonical identifier identifying one or more users of both the first user device and the second user device;
    receiving, by the server from the CES server, advertisement traffic events identified from the event data;
    determining that a first counter is not equal to a first threshold length of time;
    determining that a second counter is not equal to a second threshold length of time that is less than the first threshold length of time;
    determining that a third counter is equal to a third threshold length of time that is less than the second threshold length of time; and
    generating, by the server, ad attribution data indicative of an attribution of the conversion event to an advertisement of an advertisement campaign.

6. The method of claim 5, further comprising:
    transmitting, by the server, the ad attribution data to a datastore;
    retrieving, by the server, the ad attribution data; and
    modifying, by the server, the one or more attribution models using the ad attribution data.

7. The method of claim 5, further comprising:
    executing, by the server, the one or more attribution models, wherein the one or more attribution models use the identity mappings and the advertisement traffic events to generate the ad attribution data.

8. The method of claim 5, wherein the ad attribution data is generated using the event data from an attribution window, wherein the attribution window is a period of time prior to the conversion event used to identify the advertisement that may receive credit for the conversion event.

9. The method of claim 5, further comprising:
setting, by the server, the first threshold to be less than the second threshold; and
setting, by the server, the second threshold to be less than the third threshold.

10. The method of claim 5, further comprising:
identifying, by the server, a first conversion event from the identity mappings and advertisement traffic events;
identifying, by the server, a first candidate advertisement from the identity mappings and the advertisement traffic events;
determining, by the server, the first candidate advertisement is a secondary advertisement;
determining, by the server, a first view discount rate of the first candidate advertisement;
generating, by the server, a first attribution probability using a generated random number and the first view discount rate;
comparing, by the server, the first attribution probability to an attribution threshold; and
generating, by the server, the ad attribution data attributing the first candidate advertisement with the first conversion event in response to determining the first attribution probability exceeds the attribution threshold.

11. The method of claim 10, further comprising:
identifying, by the server, a second conversion event from the identity mappings and advertisement traffic events;
identifying, by the server, a second candidate advertisement from the identity mappings and the advertisement traffic events;
determining, by the server, the second candidate advertisement is a secondary advertisement;
determining, by the server, a second view discount rate of the second candidate advertisement;
generating, by the server, a second attribution probability using a second generated random number and the second view discount rate;
determining, by the server, the second attribution probability does not exceed the attribution threshold;
identifying, by the server, a third candidate advertisement from the identity mappings and the advertisement traffic events;
determining, by the server, the third candidate advertisement is the secondary advertisement;
determining, by the server, a third view discount rate of the third candidate advertisement;
generating, by the server, a third attribution probability using a third generated random number and the third view discount rate;
determining, by the server, the second attribution probability does not exceed the attribution threshold; and
generating, by the server, the ad attribution data attributing the third candidate advertisement with the second conversion event in response to determining the third attribution probability exceeds the attribution threshold.

12. The method of claim 10, wherein the first view discount rate is specified in an associated advertisement campaign.

13. The method of claim 10, wherein the secondary advertisement is a below-the-fold advertisement.

14. The method of claim 10, wherein the first view discount rate is a value between 0 and 1 and the generated random number is a value between 0 and 1.

15. The method of claim 5, wherein generating ad attribution data further comprises:
generating, by the server, a first ad attribution data using the one or more attribution models and a product identifier product engagement scope;
generating, by the server, a second ad attribution data using the one or more attribution models and a brand product engagement scope; and
generating, by the server, a third ad attribution data using the one or more attribution models and an order product sales product engagement scope.

16. The method of claim 15, further comprising:
generating, by the server, one or more reports using the first ad attribution data, the second ad attribution data, or the third ad attribution data.

17. A computer system comprising:
at least one memory that stores computer-executable instructions;
at least one processor configured to access the at least one memory and execute the computer-executable instructions to:
receive event data generated and received from a first device and a second device, the first device and the second device in communication with a computer device over a network;
transmit the event data to an identity resolution service (IRS) server;
transmit the event data to a consolidated event store (CES) server;
receive, the IRS server, identity mappings generated using the event data, wherein the identity mappings comprise a mapping of anonymized identifiers associated with a user to identifiers associated with user devices;
determine a canonical identifier, wherein the canonical identifier is associated with the identity mappings, wherein the canonical identifier comprises at least apportion of the anonymized identifiers;
link, based at least in part on the canonical identifier and the associated identity mappings, in a database, one or more shopping events in the event data with a conversion event, the canonical identifier identifying one or more users of both the first device and the second device;
receive, from the CES server, advertisement traffic events identified from the event data;
determine that a first counter is not equal to a first threshold length of time;
determine that a second counter is not equal to a second threshold length of time that is less than the first threshold length of time;
determine that a third counter is equal to a third threshold length of time that is less than the second threshold length of time; and
generate, using one or more attribution models, ad attribution data indicative of an attribution of the conversion event to an advertisement of an advertisement campaign.

18. The system of claim 17, wherein the at least one processor is configured to access the at least one memory and to further execute the computer-executable instructions to:
transmit the ad attribution data to a datastore.

19. The system of claim 18, wherein the at least one processor is configured to access the at least one memory and to further execute the computer-executable instructions to:

retrieve the ad attribution data from the datastore; and modify the one or more attribution models using the ad attribution data.

20. The system of claim 18, wherein to generate the ad attribution data, the at least one processor is configured to access the at least one memory and to further execute the computer-executable instructions to:

generate a first ad attribution data using the one or more attribution models and a product identifier product engagement scope;

generate a second ad attribution data using the one or more attribution models and a brand product engagement scope; and generate a third ad attribution data using the one or more attribution models and an order product sales product engagement scope.

21. The system of claim 17, wherein the at least one processor is configured to access the at least one memory and to further execute the computer-executable instructions to:

execute the one or more attribution models, wherein the one or more attribution models use the identity mappings and the advertisement traffic events to generate the ad attribution data.

22. The system of claim 17, wherein the ad attribution data is generated using the event data from an attribution window and wherein the attribution window is a period of time prior to the conversion event used to identify the advertisement that may receive credit for the conversion event.

23. The system of claim 17, wherein the at least one processor is configured to access the at least one memory and to further execute the computer-executable instructions to:

identify a first conversion event from the identity mappings and advertisement traffic events;

identify a first candidate advertisement from the identity mappings and the advertisement traffic events;

determine the first candidate advertisement is a secondary advertisement;

determine a first view discount rate of the first candidate advertisement;

generate a first attribution probability using a generated random number and the first view discount rate;

compare the first attribution probability to an attribution threshold; and generate the ad attribution data attributing the first candidate advertisement with the first conversion event in response to determining the first attribution probability exceeds the attribution threshold.

24. The system of claim 23, wherein the at least one processor is configured to access the at least one memory and to further execute the computer-executable instructions to:

identify a second conversion event from the identity mappings and advertisement traffic events;

identify a second candidate advertisement from the identity mappings and the advertisement traffic events;

determine the second candidate advertisement is a secondary advertisement;

determine a second view discount rate of the second candidate advertisement;

generate a second attribution probability using a second generated random number and the second view discount rate;

determine the second attribution probability does not exceed the attribution threshold;

identify a third candidate advertisement from the identity mappings and the advertisement traffic events;

determine the third candidate advertisement is the secondary advertisement;

determine a third view discount rate of the third candidate advertisement;

generate a third attribution probability using a third generated random number and the third view discount rate;

determine the second attribution probability does not exceed the attribution threshold; and generate the ad attribution data attributing the third candidate advertisement with the second conversion event in response to determining the third attribution probability exceeds the attribution threshold.

25. The system of claim 23, wherein the first view discount rate is specified in an associated advertisement campaign.

26. The system of claim 23, wherein the first view discount rate is a value between 0 and 1 and the generated random number is a value between 0 and 1.

* * * * *